United States Patent
Mitchell, Jr.

(10) Patent No.: US 9,501,952 B2
(45) Date of Patent: Nov. 22, 2016

(54) BALL COLLISION DEMONSTRATION DEVICE

(71) Applicant: Robert L. Mitchell, Jr., Orlando, FL (US)

(72) Inventor: Robert L. Mitchell, Jr., Orlando, FL (US)

( * ) Notice: Subject to any disclaimer, the term of this patent is extended or adjusted under 35 U.S.C. 154(b) by 265 days.

(21) Appl. No.: 14/470,015

(22) Filed: Aug. 27, 2014

(65) Prior Publication Data

US 2016/0063895 A1    Mar. 3, 2016

(51) Int. Cl.
*G09B 23/10* (2006.01)

(52) U.S. Cl.
CPC ................... *G09B 23/10* (2013.01)

(58) Field of Classification Search
CPC ....................................... G09B 23/10
USPC ........................................... 434/302
See application file for complete search history.

(56) References Cited

U.S. PATENT DOCUMENTS

| | | |
|---|---|---|
| D216,999 S | 3/1970 | Kanbar |
| D217,912 S | 6/1970 | Trippett |
| D219,515 S | 12/1970 | Levitt |
| 3,594,925 A | 7/1971 | Abbat |
| 3,930,649 A | 1/1976 | Yackel, Jr. |
| 4,739,995 A | 4/1988 | Yackel, Jr. |
| 5,158,462 A * | 10/1992 | Hones ............... G09B 23/08 434/300 |
| D684,628 S | 6/2013 | Hiller |

OTHER PUBLICATIONS

"DX: Newton's Cradle Balance Balls Science Pendulum," DealeXtreme DV, https://www.youtube.com/watch?v=bTWaNdqiuzU, Jul. 20, 2014.*
"Pendulum Waves," Harvard Natural Sciences Lecture Demonstrations, https://www.youtube.com/watch?v=yVkdfJ9PkRQ, Jun. 9, 2010.*
"Charleston Daily Mail Newspaper Archive: Nov. 28, 1968—p. 15" http://newspaperarchive.com/us/west-virginia/charleston/charleston-daily-mail/1968/11-28/page-15; 4 pgs.
"H51S Newton's Cradle Balance Balls Science Pendulum Desktop Toy—red Brown + Silver" http:///www.dxcom/p/h51s-newton-s-cradel-balance-balls-science-pendelum-desktop-toy-red-brown-silver-179805?tc=USD8tgclid=CjgKEAjw2dq-lXjpf.

* cited by examiner

*Primary Examiner* — Robert J Utama
*Assistant Examiner* — Jennifer L Korb
(74) *Attorney, Agent, or Firm* — Allen, Dyer, Doppelt, Milbrath & Gilchrist, P.A.

(57) ABSTRACT

A ball collision demonstration device includes a base, and first and second support assemblies carried by the base. The first and second support assemblies are spaced-apart and angled away from each other so that a separation distance at opposing ends of the first and second support assemblies is greater than a separation distance at medial portions of the first and second support assemblies. The device further includes balls, and a respective pairs of flexible lines coupled between the first and second support assemblies and each ball. The balls are suspended in a horizontal line parallel to the base. The respective pairs of flexible lines have, from the medial portions towards the opposing ends of the first and second support assemblies, increasing line lengths and increasing separation distances between each pair.

18 Claims, 14 Drawing Sheets

BALL COLLISION DEMONSTRATION DEVICE

FIELD OF THE INVENTION

The present invention relates to the field of pendular devices, and, more particularly, to variations of Newton's Cradle.

BACKGROUND OF THE INVENTION

Newton's cradle is a ball collision demonstration device that demonstrates conservation of momentum and energy via a series of swinging balls. Newton's cradle is a popular and well known amusement device and may be found sitting on office desks, for example, around the world.

A typical Newton's cradle includes a series of identically sized metal balls suspended from a frame so that they are just touching each other at rest. Each ball is attached to the frame by two lines of equal length angled away from each other. This restricts the pendulums' movements to the same plane.

If a first ball is pulled away and released, it strikes the next ball in the series and comes to nearly a dead stop. The last ball on the opposite side of the series acquires most of the velocity and almost instantly swings in an arc almost as high as the release height of the first ball. This shows that the last ball receives most of the energy and momentum that was in the first ball.

The impact produces a shock wave that propagates through the intermediate balls between the first and last balls. Any efficiently elastic material, such as steel, will do this as long as the kinetic energy is temporarily stored as potential energy in the compression of the material rather than being lost as heat. If two balls, for example, are pulled away and released, then two balls on the opposite side swing out and back.

Over the decades, there have been various design variations to Newton's cradle. For example, U.S. Pat. No. 5,158,462 to Hones et al. discloses a ball collision device comprising several balls hanging from a support structure. Each ball has a different mass, and is arranged in close proximity in order of decreasing mass with their centers lying along a horizontal straight line. When the heaviest ball, hanging at one end of the line, is pulled back and released, the resulting impact leads to a transfer of energy through the line of balls to the lightest one, at the other end of the line, which is accelerated to a high velocity. When appropriately directed, this high velocity can cause the lightest ball to rise to a much greater height than that from which the heaviest ball was released. The device does not permit the lightest ball to rise to its full possible height, and instead, uses a wind-up bar to intercept its rise and cause it to return to its rest position.

Another variation of Newton's cradle is disclosed in U.S. Pat. No. 3,594,925 to Abbat. Abbat discloses an amusement device comprising a generally parallelepiped-shaped frame member in which a plurality of spherical mass retaining yokes are freely suspended. The frame member includes a pair of side plates detachably connected by a plurality of elongated braces. The mass-retaining members are detachably mounted in the frame member, whereby the entire device may be assembled in a relatively compact package for carrying or storing.

Yet another variation of Newton's cradle is where the support structure includes a pair of spaced apart rails, and each rail is curved upwards. As a result, the lines attached to the balls have longer lengths at the opposing ends of the rails as compared to the lines at the middle of the rails.

Even in view of the above variations on Newton's cradle, there is still a demand for further variations, as evidenced by the popularity of such ball collision devices.

SUMMARY OF THE INVENTION

In view of the foregoing background, it is therefore an object of the present invention to provide a ball collision demonstration device having variations from a typical ball collision device commonly know as Newton's cradle.

This and other objects, features, and advantages in accordance with the present invention are provided by a ball collision demonstration device comprising a base, and first and second support assemblies carried by the base and spaced-apart and angled away from each other so that a separation distance at opposing ends is greater than a separation distance at medial portions of the first and second support assemblies.

The ball collision demonstration device may further include a plurality of balls, and respective pairs of flexible lines coupled between the first and second support assemblies and each ball, with the plurality of balls being suspended in a horizontal line parallel to the base. The respective pairs of flexible lines may have, from the medial portions towards the opposing ends of the first and second support assemblies, increasing line lengths and increasing separation distances between each pair.

Pulling back and releasing at least one ball at a first end of the horizontal line causes at least one ball at a second end of the horizontal line to rise to a height approximately equal to a height that the at least one ball at the first end was released. An advantage of having the respective pairs of flexible lines progressively increase in length and in width between the first and second support assemblies when moving outwards form the medial portions is that the outmost ball is able to have a larger swing arc which imparts more force to the other balls as compared to the flexible lines all having the same length and width. The outermost ball is thus able to be pulled further back prior to being released.

Each of the first and second support assemblies may comprise a continuously extending rail supported by a plurality of legs. Alternatively, each of the first and second support assemblies may comprise a series of spaced apart vertically oriented posts.

The first and second support assemblies may be coplanar. Alternatively, the first and second support assemblies may be non-planar so that a height of the first and second support assemblies from the base increases from the medial portions to the opposing ends.

Each of the first and second support assemblies may have a parabolic/curved shape or a V-shape, for example. Each of the balls may comprise steel, for example.

In other embodiments, the plurality of balls may comprises a pair of outermost balls and a plurality of intermediate balls between the pair of outermost balls, with each intermediate ball comprising ferromagnetic material. A plurality of ferromagnetic materials may be carried by the base, with each ferromagnetic material in the base being positioned directly under a respective intermediate ball. At least one of the ferromagnetic materials in the balls and the base may be magnetized. The magnetization helps to keep the intermediate balls in a tight formation without any gaps therebetween.

In another embodiment of the ball collision demonstration device, first and second support assemblies are carried by the base and are spaced-apart and angled from each other so that a separation distance at opposing ends is greater than a separation distance at medial portions of the first and second support assemblies. The first and second support assemblies may comprise a first and a second series of spaced apart vertically oriented posts, and with each post in the first series being paired with a corresponding post in the second series.

Respective T-bars may comprise a horizontal segment and a vertical segment extending downwards from the horizontal segment, with each horizontal segment being pivotally coupled to one of the paired posts in the first and second series and with each vertical segment coupled to one of the balls. The balls may be suspended in a horizontal line parallel to the base. The respective T-bars may have, from the medial portions towards the opposing ends of the first and second support assemblies, increasing lengths in the vertical segments and increasing lengths in the horizontal segments.

A height of the first and second series of paired posts may be equal so that the first and second support assemblies are coplanar. Alternatively, the height of the first and second series of paired posts may not be equal so that the first and second support assemblies are non-planar, and a length of each vertical segment of a T-bar increases in length from middle pairs posts to the outermost paired posts as the paired posts increase in height.

DETAILED DESCRIPTION OF THE PREFERRED EMBODIMENTS

Figure 1:
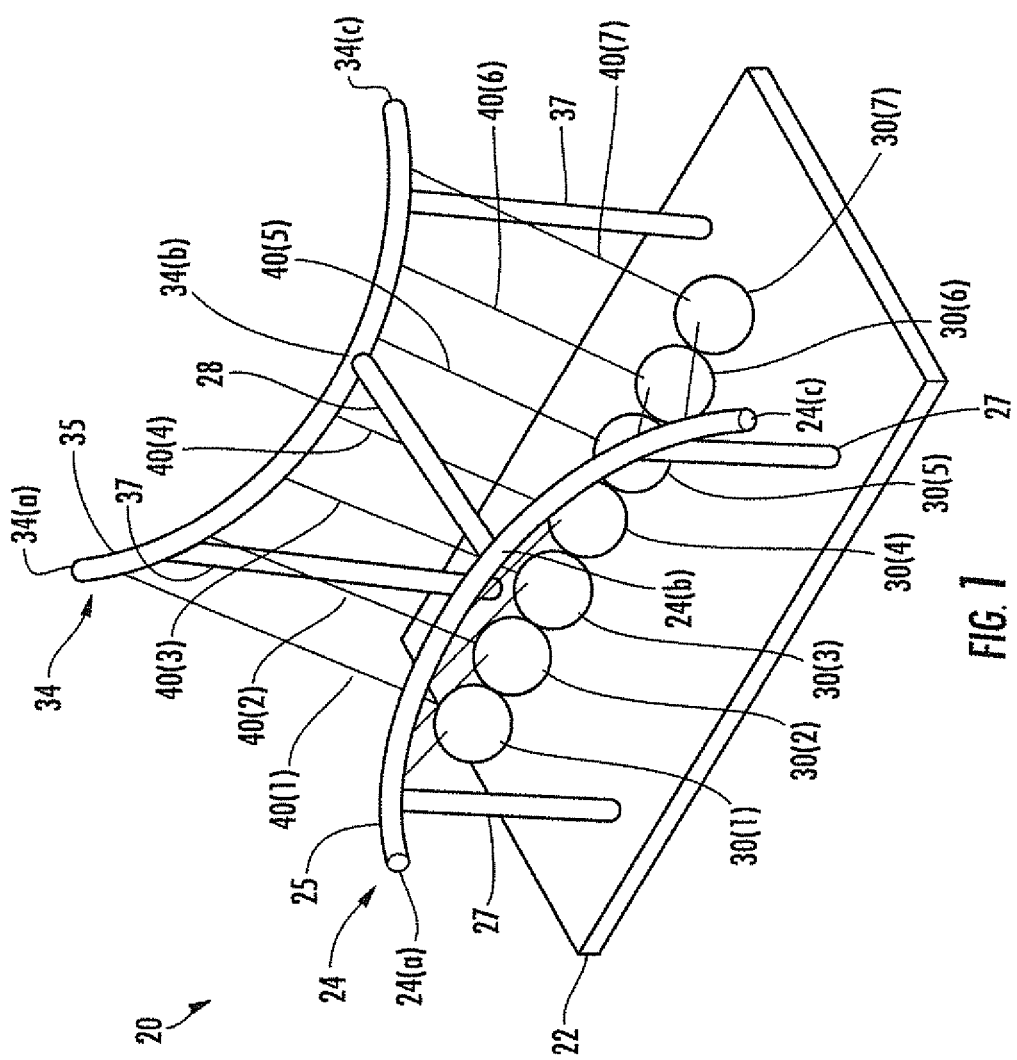
FIG. 1 is a perspective view of a ball collision demonstration device with parabolic shaped rails in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-4, the illustrated ball collision demonstration device 20 includes a base 22, and first and second support assemblies 24, 34 carried by the base. The first and second support assemblies 24, 34 are spaced-apart and angled away from each other so that a separation distance at opposing ends 24(a), 34(a) and 24(c), 34(c) is greater than a separation distance at medial portions 24(b), 34(b) of the first and second support assemblies.

The ball collision demonstration device 20 further includes a plurality of balls 30(1)-30(7), and respective pairs of flexible lines 40(1)-40(7) coupled between the first and second support assemblies 24, 34 and each ball. Each pair of flexible lines 40(1)-40(7) may be separate lines, i.e., two separate lines per pair. Alternatively, each pair of flexible lines 40(1)-40(7) may be a single continuous line that forms the pair of flexible lines. For the single continuous line, the line is inserted through an opening in the ball or through an attachment, e.g., an eyelet carried by the ball.

The balls 30(1)-30(7) are suspended in a horizontal line 60 parallel to the base 22. The respective pairs of flexible lines 40(1)-40(7) have, from the medial portions 24(b), 34(b) towards the opposing ends 24(a), 34(a) and 24(c), 34(c) of the first and second support assemblies 24, 34, increasing line lengths and increasing separation distances between each pair.

As readily understood by one skilled in the art, pulling back and releasing at least one ball 30(1) at a first end of the horizontal line 60 causes at least one ball 30(7) at a second end of the horizontal line to rise to a height approximately equal to a height that the at least one ball at the first end was released.

An advantage of having the respective pairs of flexible lines 40(1)-40(7) progressively increase in length and in width between the first and second support assemblies 24, 34 when moving outwards form the medial portions 24(b), 34(b) is that the outmost ball 30(1) is able to have a larger swing arc which imparts more force to the other balls 30(2)-30(7) as compared to the flexible lines all having the same length and width. The outermost ball 30(1) is thus able to be pulled further back prior to being released.

The swing arc of the balls 30(1)-30(7) thus progressively increases from the middle ball 30(4) to the outmost balls 30(1), 30(7). Another advantage of having the respective pairs of flexible lines 40(1)-40(7) progressively increase in length and in width is that if two or more balls are pulled back at the same time and released, the larger swing arc of the first ball 40(1) will not limit the swing arc of the innermost ball 40(2) since the two balls need to be touching each other when released. This would not be the case if the flexible lines 40(2)-40(6) for the intermediate balls 30(2)-30(6) all have the same length and width.

In the illustrated ball collision demonstration device 20, the first and second support assemblies 24, 34 respectively include a continuously extending rail 25, 35 supported by a plurality of legs 27, 37. A support bar 28 extends between the rails 25, 35 at the medial portions 24(b), 34(b) thereof. Although one support bar 28 is illustrated, additional support bars may be included depending on the size of the ball collision demonstration device 20.

The rails 25, 35 have a parabolic or curved shape. As noted above, the rails 25, 35 are angled away from each other so that a separation distance D1 at opposing ends 24(a), 34(a) and 24(c), 34(c) is greater than a separation distance D2 at the medial portions 24(b), 34(b) thereof. As an alternative to the rails having a parabolic/curved shape, the rails 25', 35' may have an angled or V-shape, as illustrated by the top view of the ball collision demonstration device 20' in FIG. 5.

Figure 4:
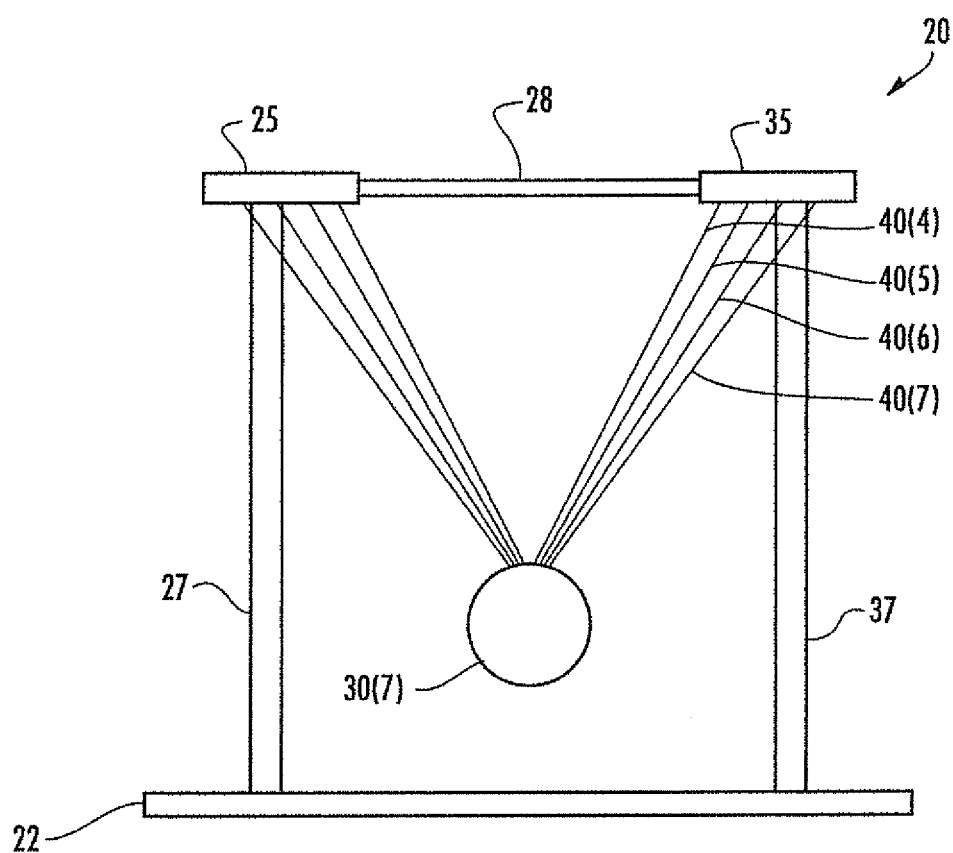
FIG. 4 is an end view of the ball collision demonstration device shown in FIG. 1.
Figure 5:
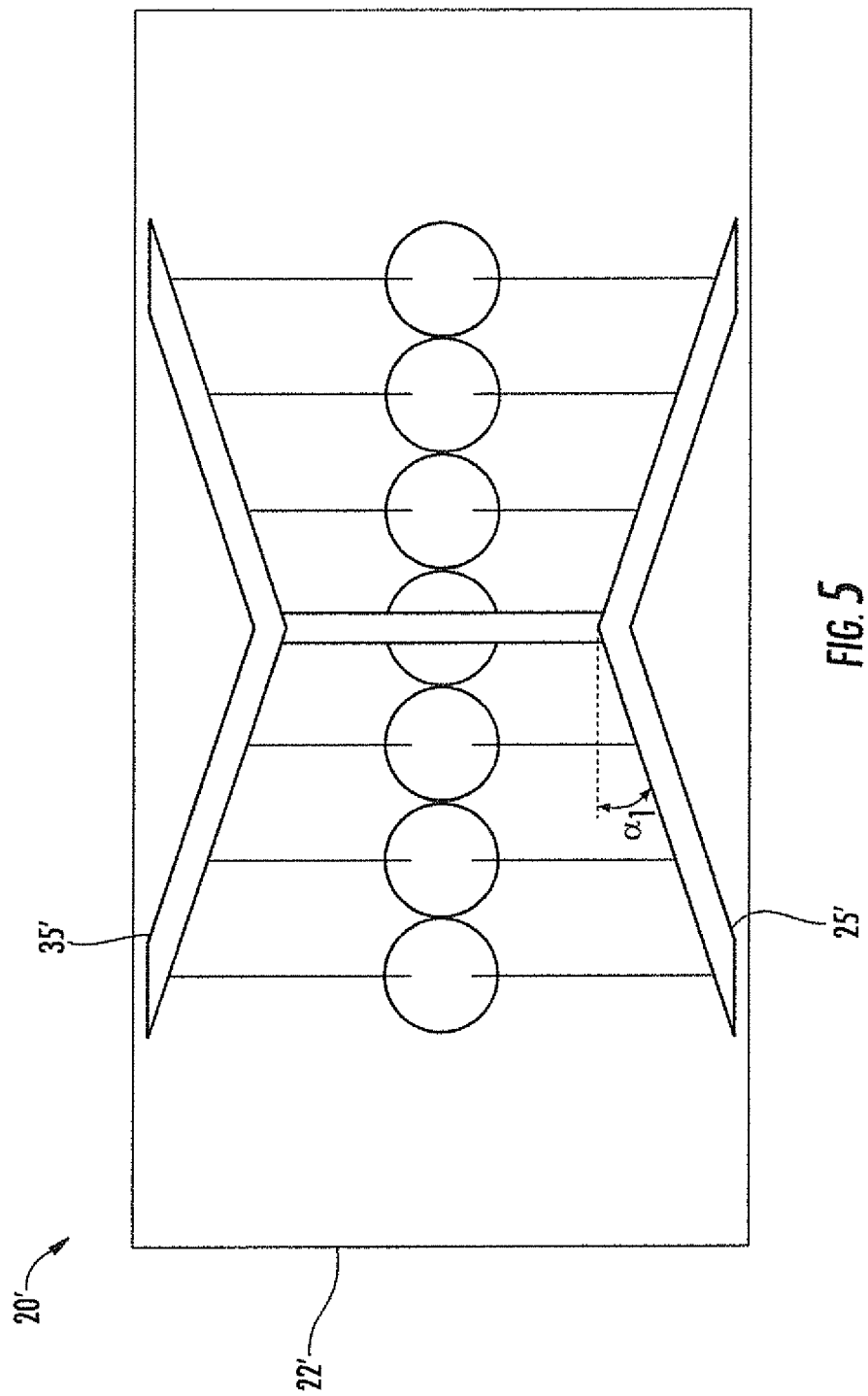
FIG. 5 is a top view of an alternative embodiment of the ball collision demonstration device shown in FIG. 1 with V-shaped rails.

The V-shaped rails 25', 35' and the parabolic shaped rails 25, 35 are not limited to any particular angle. As an example, the angle $\alpha 1$ as illustrated in FIG. 5 may be within 20 to 60 degrees, for example, although an angle outside of this range may still be used. The parabolic/curved and V-shaped rails 25, 35 and 25', 35' are coplanar. As best illustrated in FIGS. 2 and 4, the rails 25, 35 lie in the same plane.

Figure 2:
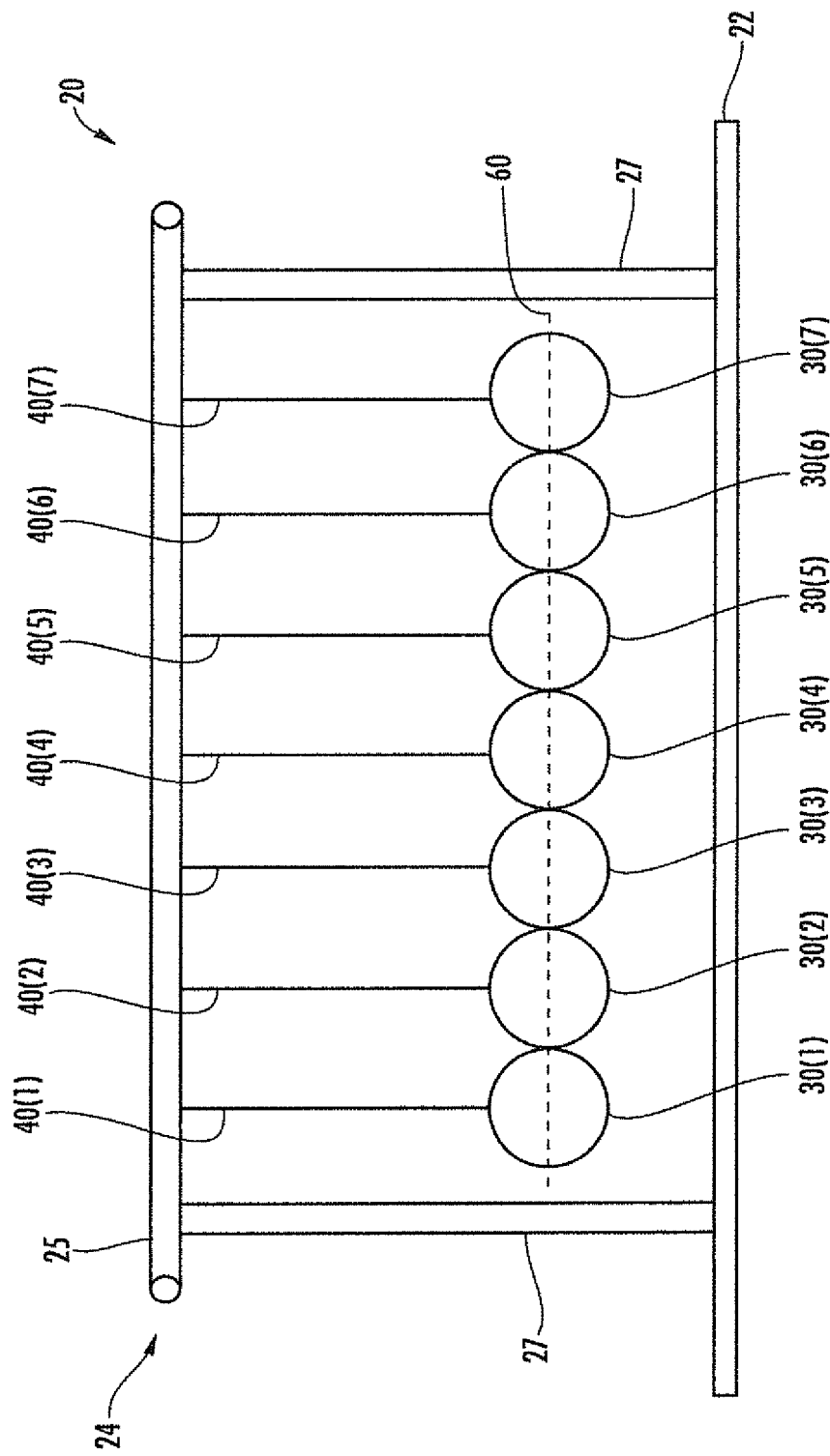
FIG. 2 is side view of the ball collision demonstration device shown in FIG. 1.
Figure 3:
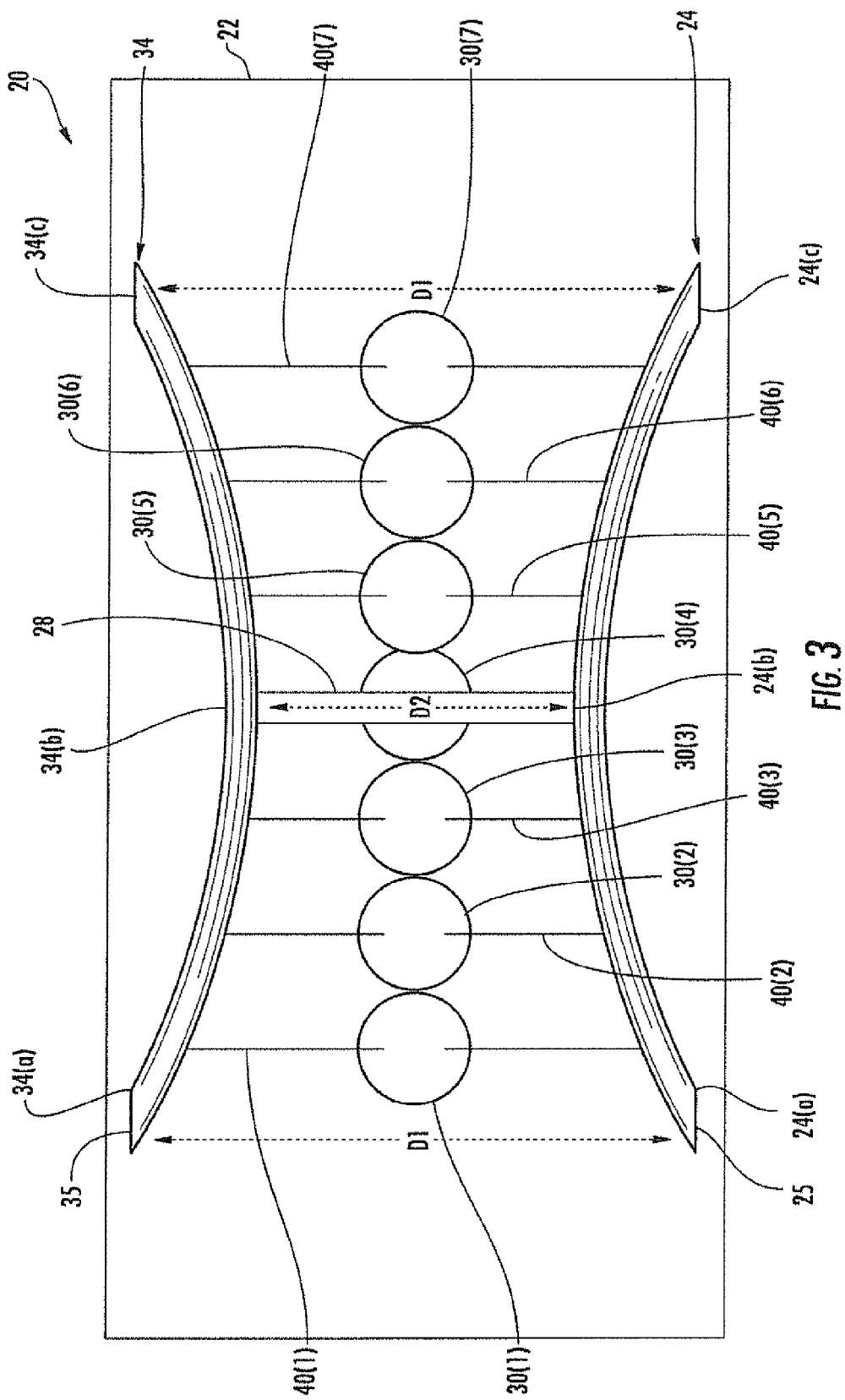
FIG. 3 is a top view of the ball collision demonstration device shown in FIG. 1.

As best illustrated in FIG. 2, the balls 30(1)-30(7) are suspended by the flexible lines 40(1)-40(7) so that they are aligned in a horizontal line 60 parallel to the base 22. The flexible lines 40(1)-40(7) increase in length and increase in a separation distance between the rails 25, 35 when moving outwards form the medial portions 24(b), 34(b) to the opposing ends 24(a), 34(a) and 24(c), 34(c) of the rails 25, 35, as best illustrated in FIG. 3.

The base 22 may be wood or thermoplastic, for example. The flexible lines 40(1)-40(7) may be fishing line, for example. The balls 30(1)-30(7) are solid, and preferably comprise an elastic material, such as steel. Alternatively, the balls 30(1)-30(7) may be hollow. Even though the illustrated balls 30(1)-30(7) have a spherical shape, other shapes may be used. For example, the balls 30(1)-30(7) may have non-spherical features, such as polygonal features and shapes. Although the illustrated ball collision demonstration device 20 includes 7 balls, a different number of balls may be used. Preferably, an odd number of balls are used although an even number may be used.

Figure 6:
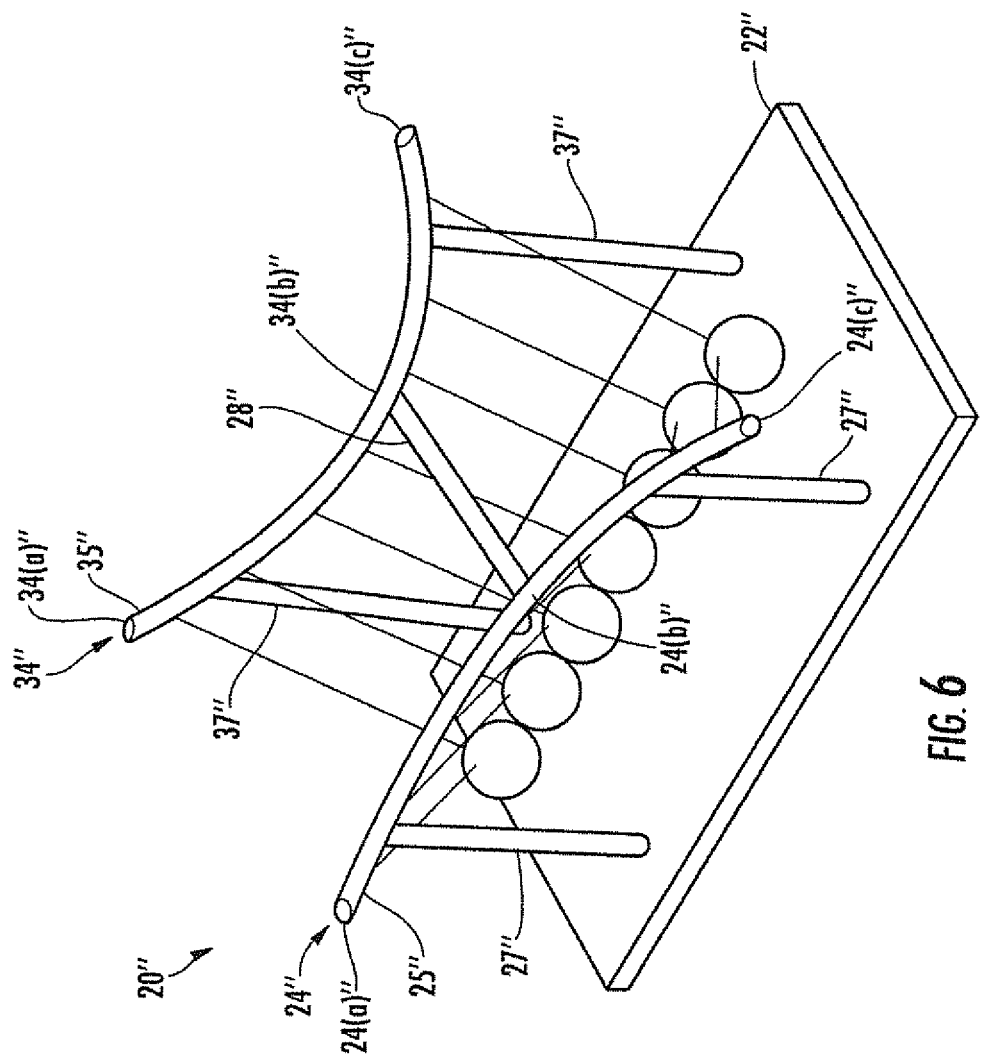
FIG. 6 is a perspective view of a ball collision demonstration device with non-planar rails in accordance with the present invention.
Figure 7:
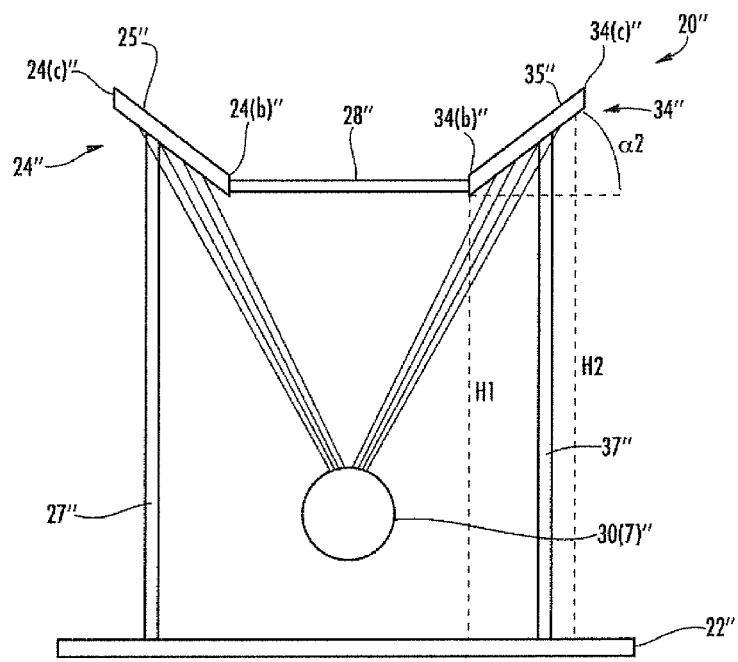
FIG. 7 is an end view of the ball collision demonstration device shown in FIG. 6.

Referring now to FIGS. 6 and 7, another embodiment of the ball collision demonstration device 20" includes non-planar rails 25", 35". A distance or height between the rails 25", 35" and the base 22" increases from the medial portions 24(b)", 34(b)" to the opposing ends 24(a)", 34(a)" and 24(c)", 34(c)".

The ends 24(a)", 34(a)" and 24(c)", 34(c)" thus have a curved or upwards shape with respect to the medial portions 24(b)", 34(b)" of the rails 24", 34". As best illustrated in FIG. 7 by the end view of the ball collision demonstration device 20", the medial portions 24(b)", 34(b)" are at a height H1 and the ends 24(a)", 34(a)" and 24(c)", 34(c)" of the rails 24", 34" are at a height H2, where H2 is greater than H1. In this illustrated embodiment, the rails 25", 35" have a parabolic shape. Alternatively, the rails may have a V-shape as discussed above.

The non-planar angle $\alpha 2$ of the rails 25", 35" is not limited to any particular angle. As an example, the angle $\alpha 2$ may be within 20 to 60 degrees, for example, although an angle outside of this range may still be used. Angle $\alpha 2$ is separate from the angle $\alpha 1$. However, angle $\alpha 1$ is still applicable to the angle of the rails and is in combination with the angle $\alpha 2$, which may also be referred to as the tilt angle of the rails. For the coplanar configuration, the tilt angle is zero.

Figure 8:
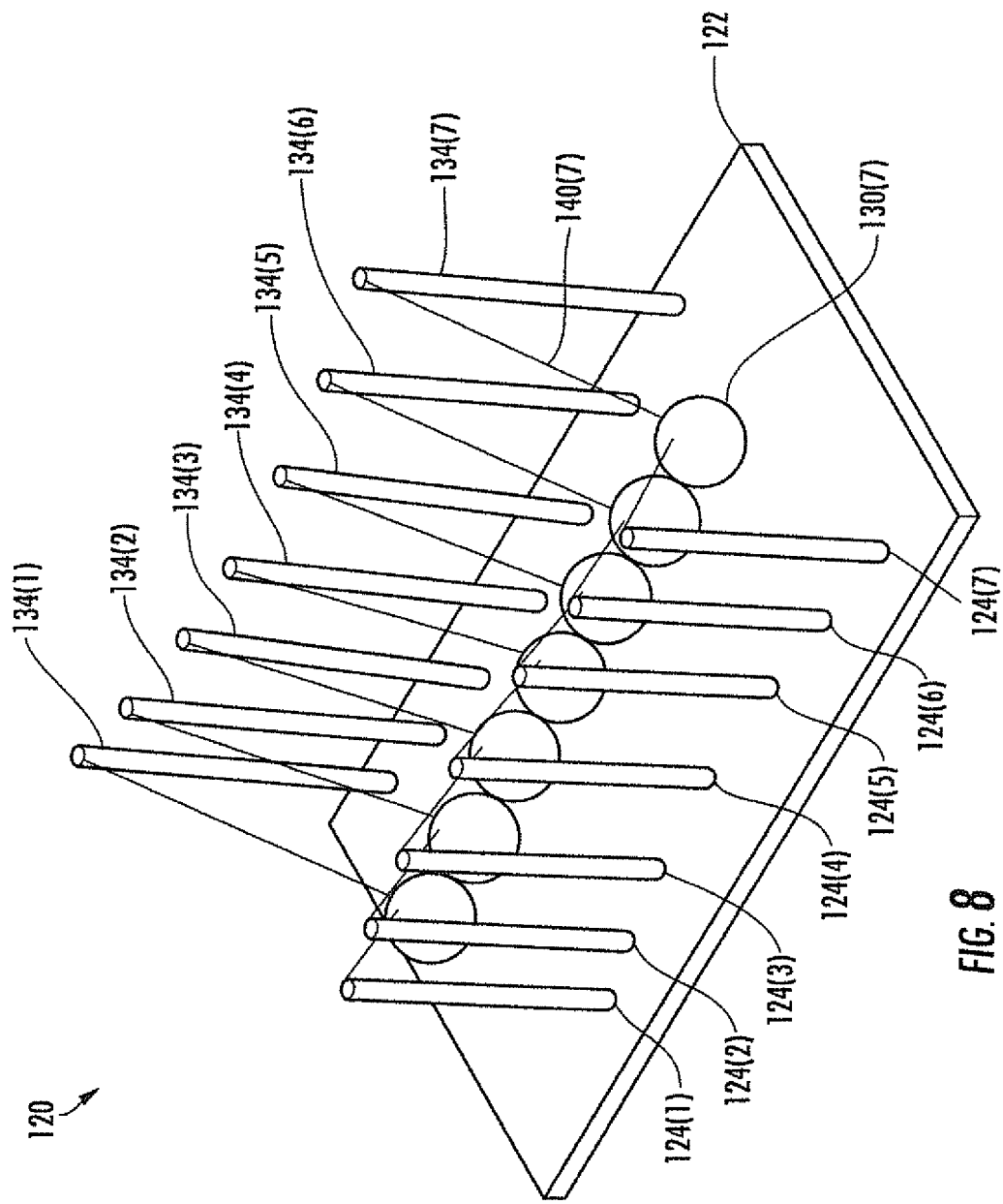
FIG. 8 is a perspective view of a ball collision demonstration device with a series of vertically oriented posts in accordance with the present invention.
Figure 9:
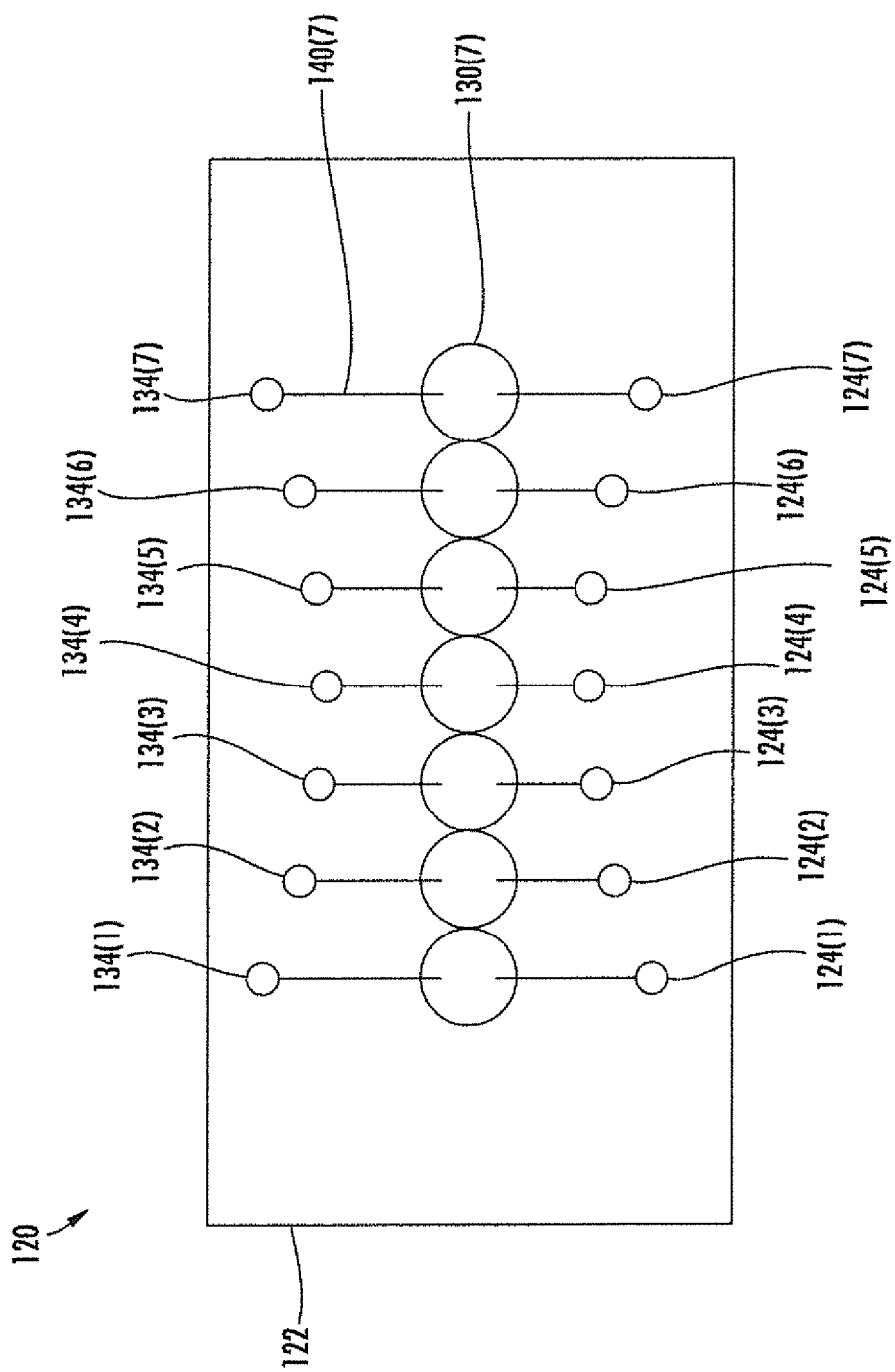
FIG. 9 is a top view of the ball collision demonstration device shown in FIG. 8.

In yet another embodiment of the ball collision demonstration device 120, the first and second support assemblies comprises a series of spaced apart vertically oriented posts 124(1)-124(7) and 134(1)-134(7), as illustrated in FIGS. 8 and 9. There are two posts for each ball, where a pair of flexible lines is coupled between the two posts and the ball. For example, ball 130(7) is suspended by the pair of flexible lines 140(7) between posts 124(7) and 134(7). Attachment of the flexible line to each post may be to the top of the post or to the side of the post near the top.

In the illustrated embodiment, positioning of the posts 124(1)-124(7) and 134(1)-134(7) on the base 122 has a curved or angled shape so that the respective pairs of flexible lines have, from the middle post 124(4), 134(4), an increase in length and increase in a separation distance when moving towards the outer posts 124(1), 134(1) and 124(7), 134(7). The height of all the posts may be the same, as illustrated in FIG. 8. This corresponds to the coplanar rails 25, 35 in the above-described coplanar embodiments.

Alternatively, the posts may have different heights. The height of the posts would increase from the middle post 124(4), 134(4) to the outer posts 124(1), 134(1) and 124(7), 134(7). This corresponds to the non-planar rails 25", 35" in the above-described coplanar embodiments.

A common problem with a typical Newton's cradle is that there may be a degree of wobble on the suspended balls. This leads to the balls not making solid contact with one another when suspended, which can impede a smooth, crisp pendulum action of the balls.

Figure 10:
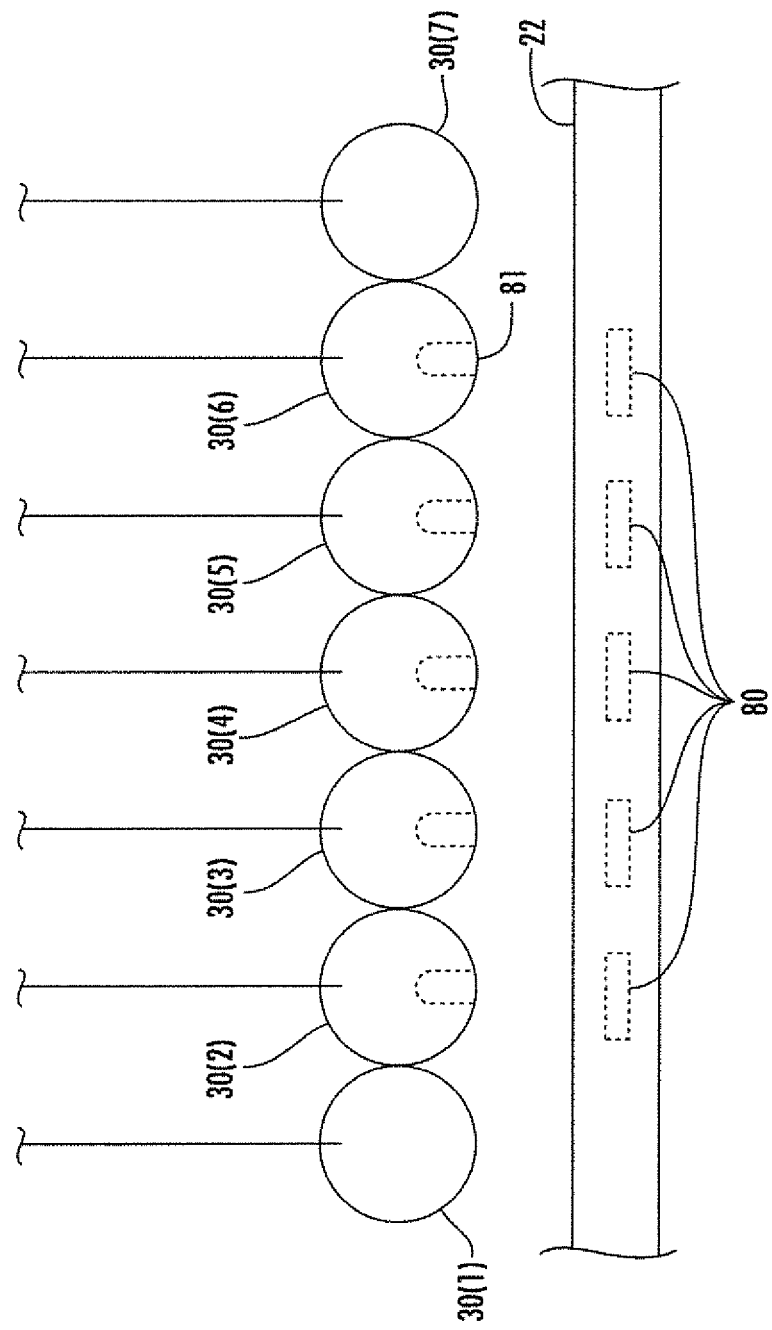
FIG. 10 is a partial side view of the ball collision demonstration device shown in FIG. 1 with magnets carried by the base, and optionally, carried by non-magnetic balls.

Referring now to FIG. 10, magnets or ferromagnetic material 80 are carried by the base 22, with each magnet or ferromagnetic material being positioned directly under a respective intermediate ball 30(2)-30(6). The intermediate balls 30(2)-30(6) may also carry a magnet or ferromagnetic material 81. Each magnet or ferromagnetic material 81 is illustrated as an insert within an intermediate ball. Alternatively, the entire intermediate ball may be formed as a magnet or out of ferromagnetic material.

The magnetic attraction between the base 22 and the intermediate balls 30(2)-30(6) keeps the intermediate balls in a tight formation without any gaps therebetween. The use of magnets and ferromagnetic material as described herein is also applicable to a standard Newton's cradle, as readily appreciated by those skilled in the art.

In other embodiments, the outer balls 30(1), 30(7) may also include magnets or ferromagnetic material. Similarly, magnets or ferromagnetic material would also be carried by the base 22, with each magnet or ferromagnetic material being positioned directly under a respective outer ball 30(1), 30(7).

The size of the magnets depend on the size of the balls as well as the separation distance of the balls from the base 22. If the intermediate balls 30(2)-30(6) were a non-ferromagnetic material, such as ceramic, for example, then the magnetic inserts 81 may be placed within the non-ferromagnetic balls. The magnets and the magnetic inserts are positioned so that opposite poles are directed toward one another, as readily appreciated by those skilled in the art. The magnetic inserts 81 may be at a center of the ball or closer toward an outer surface of the ball. In other embodiments, the intermediate balls 30(2)-30(6) are of a ferromagnetic material to provide the magnetic attraction with the magnets carried by the base; and vice-versa. The outer balls 30(1), 30(7) may either be a ferromagnetic material or a non-ferromagnetic material.

Figure 11:
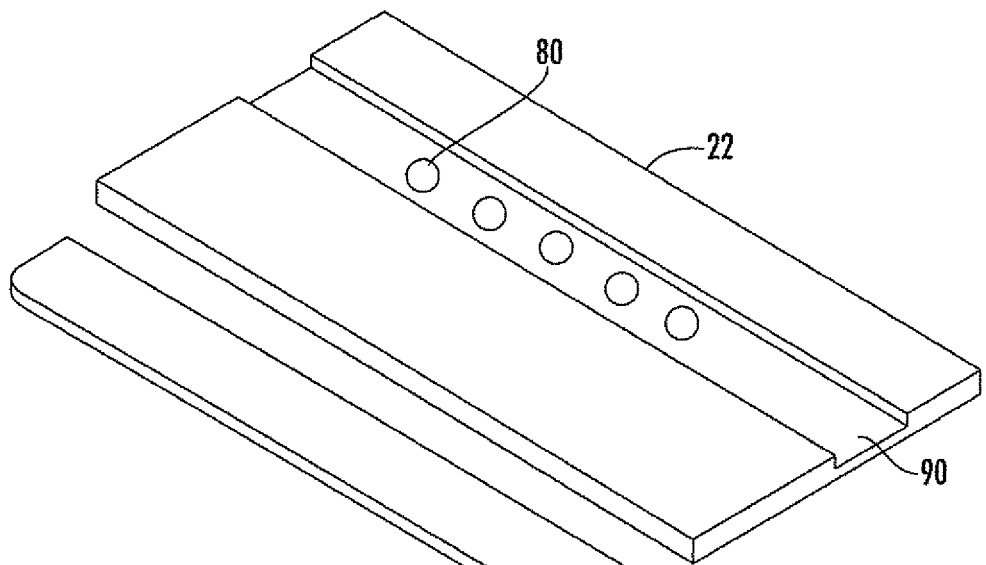
FIG. 11 is a perspective view of the base shown in FIG. 10 with the magnets placed in a channel running a length of the base.

The magnets or ferromagnetic material 80 carried by the base 22 may be in a channel 90 that runs a length of the base, as illustrated in FIG. 11. The magnets or ferromagnetic material 80 may be recessed within the channel 90. A cover 92 may be slid within the channel 90 so that the magnets or ferromagnetic material 80 are not exposed and are held in place.

Figure 12:
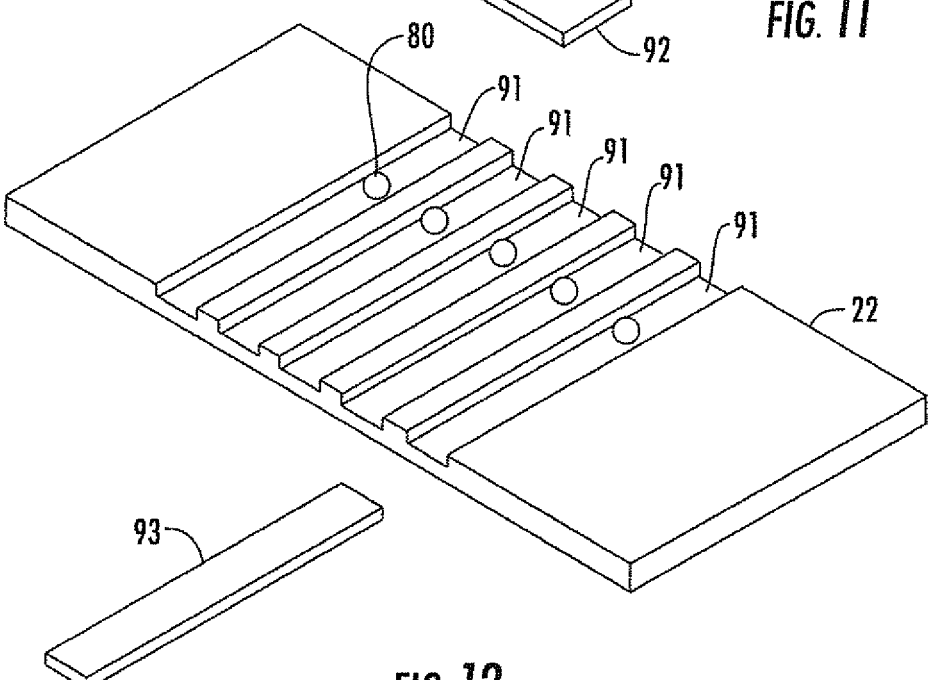
FIG. 12 is a perspective view of the base shown in FIG. 10 with the magnets placed in respective channels running across a width of the base.

Alternatively, the magnets or ferromagnetic material 80 carried by the base 22 may be in respective channels 91 that run across a width of the base 22, as illustrated in FIG. 12. Similarly, the magnets or ferromagnetic material 80 may be recessed within the channels 91. Respective covers 93 may be slid within the channels 91 to cover the exposed magnets or ferromagnetic material 80 and hold them in place. Only one of the covers 93 is shown in the figure.

The above described approaches for positioning the magnets or ferromagnetic material 80 are not to be limiting. For example, receptacles may be cut into the base 22 directly beneath the intermediate balls 30(2)-30(6), and a cap may then be used to retain the magnets or ferromagnetic material in place. The cap may be screwed on, for example. Instead of using removable covers 92, 93, as illustrated, the covers may be hinged, for example. As an alternative to the channels 90, 91 being used in the upper surface of the base 22, the channels may be recessed within the base so that there are no openings in the upper surface of the base 22. In this configuration, pre-cut receptacles in a rectangular beam would carry the magnets or ferromagnetic material 80, and the rectangular beam would be inserted from the side or end of the base into the channel.

The following different permutations and combinations of the balls and the base will now be discussed. For example, both the intermediate and outer balls may be formed from ferromagnetic material. Alternatively, both the intermediate and outer balls may be formed from non-ferromagnetic material.

Both the intermediate and outer balls of ferromagnetic material may have interaction with respective intermediate and outer base magnets. Both the intermediate and outer balls of ferromagnetic material and with magnetic inserts may have interaction with respective intermediate and outer base magnets. Both the intermediate and outer balls of ferromagnetic material and with magnetic inserts may have interaction with respective intermediate and outer base ferromagnetic material.

Both the intermediate and outer balls of non-ferromagnetic material and with magnetic inserts may have interaction with respective intermediate and outer base magnets. Both the intermediate and outer balls of non-ferromagnetic material and with magnetic inserts may have interaction with respective intermediate and outer base ferromagnetic material. Both the intermediate and outer balls of non-ferromagnetic material and with ferromagnetic inserts may have interaction with respective intermediate and outer base magnets.

All of the preceding types of ball composition and types of interactions involving magnets between the balls and the base would apply not only to the rail embodiment, but also to the post and T-bar embodiments.

As discussed above, the base may be formed using wood or a thermoplastic material, or a combination of the two. In another embodiment, the base may be formed using a ferromagnetic material. In this embodiment, the base may be partially or entirely formed from the ferromagnetic material (with at least some ferromagnetic material beneath the path of the balls while stationary and in movement). As with a ferromagnetic sheet overlay, inner layer, etc., this could serve just as well as the slots containing non-magnetized ferromagnetic material as discussed above. Alternatively, the base could be a non-ferromagnetic or a ferromagnetic base that encases one, large single magnet (or magnets grouped together in direct contact with one another). This embodiment may also have ferromagnetic material sheet overlays, inner layer, etc. This has the same purpose as the magnets in their special cavities as discussed above.

Figure 13:
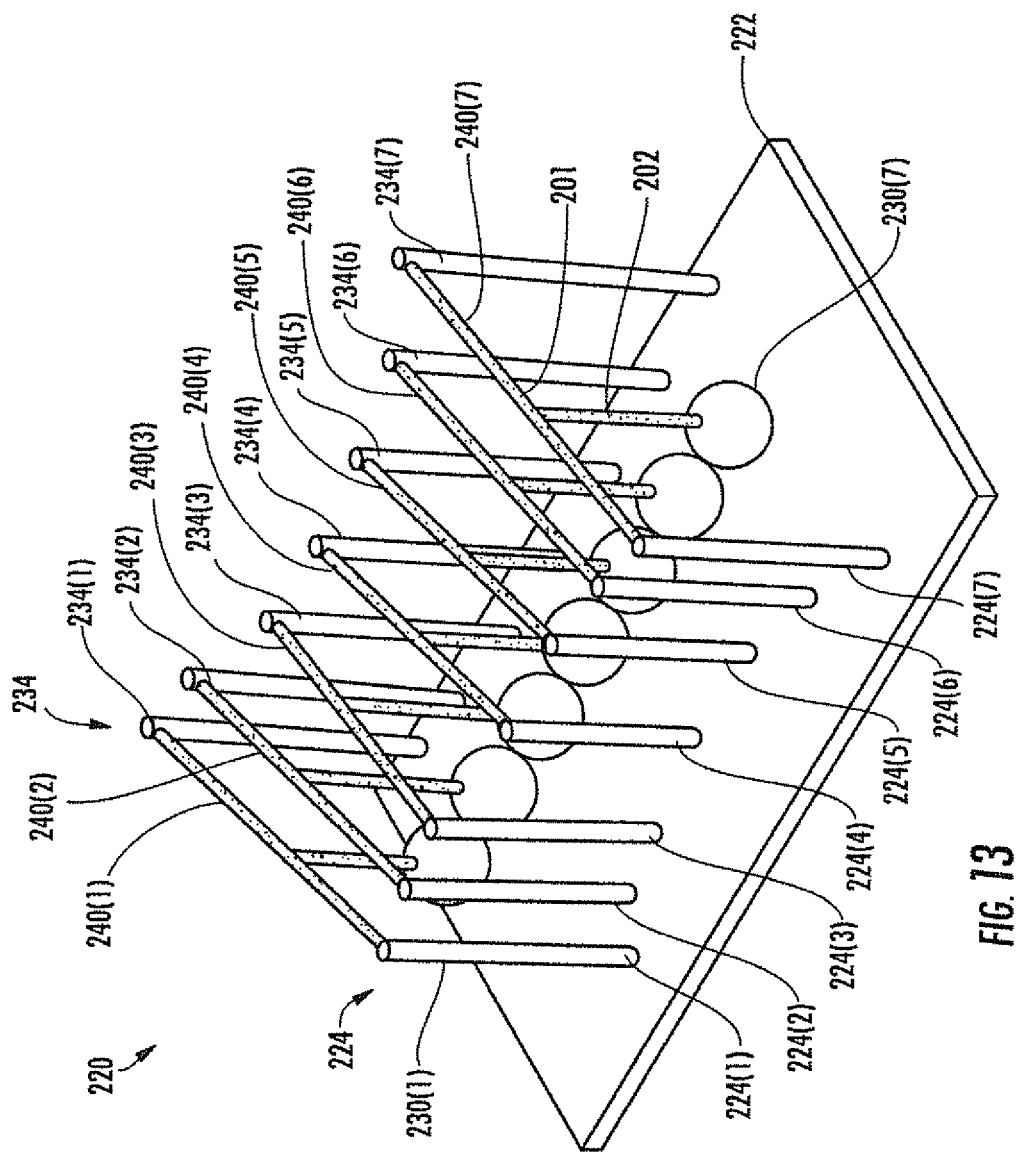
FIG. 13 is a perspective view of a ball collision demonstration device with a series of vertically oriented posts and T-bars in accordance with the present invention.
Figure 14:
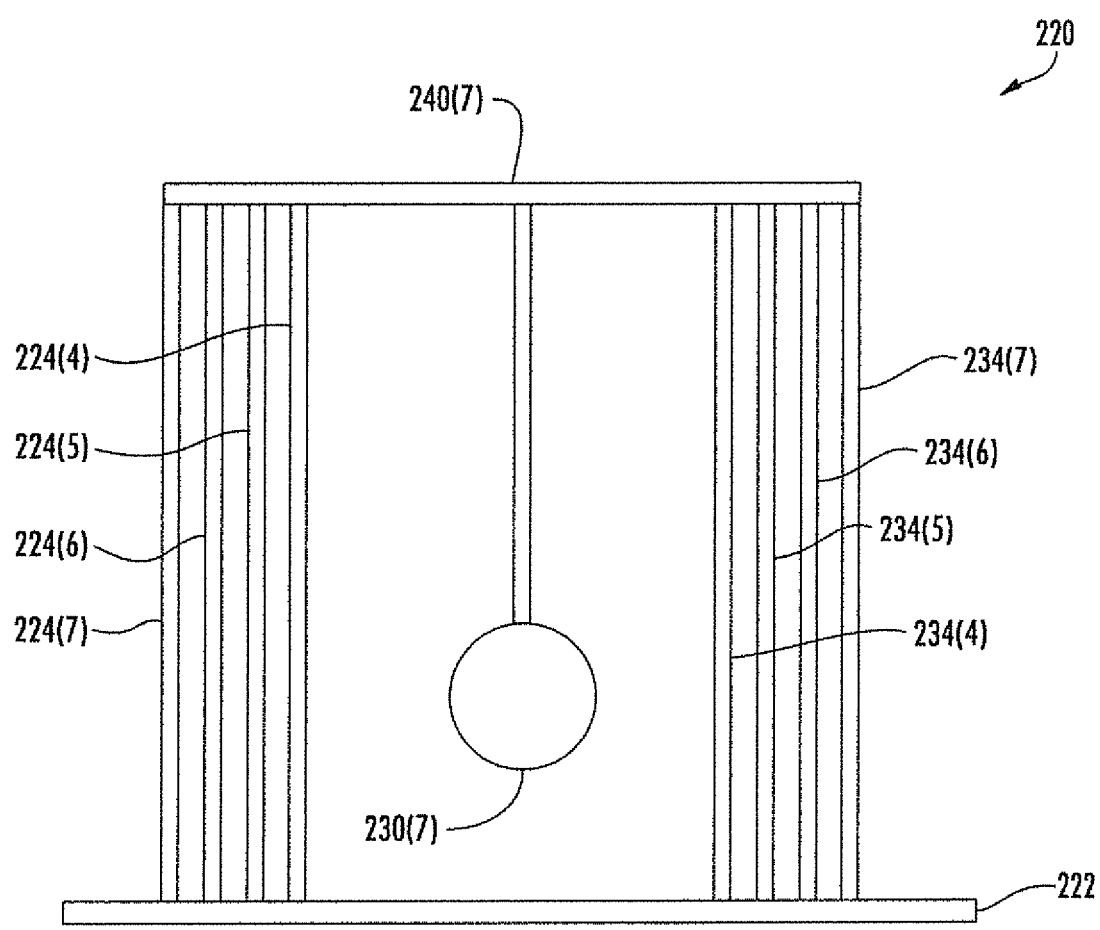
FIG. 14 is an end view of the ball collision demonstration device shown in FIG. 13.
Figure 15:
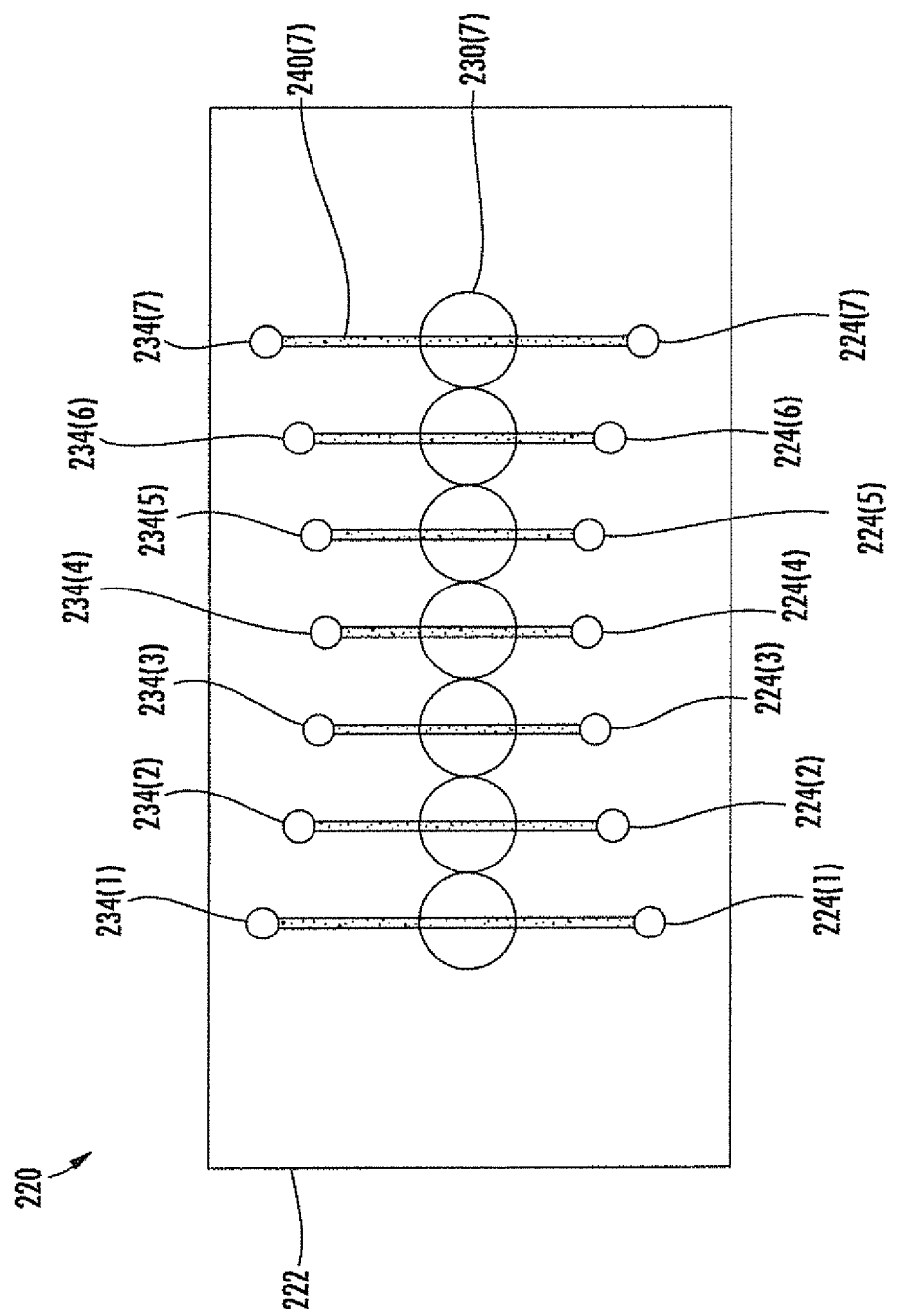
FIG. 15 is a top view of the ball collision demonstration device shown in FIG. 13

Referring now to FIGS. 13-15, another embodiment of the ball collision demonstration device 220 includes a base 222, and first and second support assemblies 224, 234 carried by the base and spaced-apart and angled from each other so that a separation distance at opposing ends is greater than a separation distance at medial portions of the first and second support assemblies. The first and second support assemblies 224, 234 include a first and a second series of spaced apart vertically oriented posts 224(1)-224(7) and 234(1)-234(7), and with each post in the first series being paired with a corresponding post in the second series. In other embodiments, the first and second support assemblies 224, 234 may respectively include a continuously extending rail supported by a plurality of legs, as illustrated in FIG. 1.

The ball collision demonstration device 220 further includes balls 230(1)-230(7), and respective T-bars 240(1)-240(7) comprising a horizontal segment 201 and a vertical segment 202 extending downwards from the horizontal segment. Each horizontal segment 201 is pivotally coupled to one of the paired posts (or to the rails), such as pair posts 224(7), 234(7) in the first and second series and with each vertical portion 202 being coupled to one of the balls, such as ball 230(7). The balls 230(1)-230(7) are suspended in a horizontal line parallel to the base 222. The respective T-bars 240(1)-240(7) have, from middle posts 224(4), 234(4) of the first and second series, increasing lengths in the horizontal segments 201 between the paired posts.

Although the illustrated T-bars 240(1)-240(7) comprise a horizontal segment 201 that is linear and a vertical segment 202 that is also linear, non-linear shapes may be used. For example, the vertical segment 202 may have a V shape, for example. With a V shape vertical element 202, then the horizontal segment 201 can be eliminated. The horizontal segment 201 may have a curved or angular shape.

As with the flexible lines discussed above, pulling back and releasing at least one ball 230(1) at a first end of the horizontal line causes at least one ball 230(7) at a second end of the horizontal line to rise to a height approximately equal to a height that the at least one ball at the first end was released.

The different co-planar and non-planar embodiments discussed above are also applicable to the T-bar configured ball collision demonstration device 220. When a height of the posts 224(1)-224(7) and 234(1)-234(7) is equal, the first and second support assemblies 224, 234 are considered co-planer. As a result, the vertical segment of each of the T-bars 240(1)-240(7) is the same length.

When a height of the posts 224(1)-224(7) and 234(1)-234(7) increases from the middle paired posts to the end paired posts, the first and second support assemblies 224, 234 are considered non-planar. As a result, the vertical segment of each of the T-bars 240(1)-240(7) increases in length from the middle paired posts to the end paired posts.

The other various features discussed above, such as the magnets and or ferromagnetic material, for example, are also applicable to the T-bar configured ball collision demonstration device 220. The first and second support assemblies as well as the base and T-Bars may be made out of plastic, wood or metal, or a combination thereof, as readily appreciated by those skilled in the art.

As noted above, the balls 30(1)-30(7) are suspended in a horizontal line 60 parallel to the base 22, 22', 22", 122, 222. The attachment points of the balls to the first and second support assemblies are shown to gradually increase in a separation distance when moving from the medial portions towards the opposing ends of the first and second support assemblies. Instead of a gradual increase in the separation distance, there may be a zig-zag pattern, for example. In a zig-zag pattern, one or more arrangements supporting a flexible line is established whereby the line deviates from an overall gradual progression of increased length from the medial aspect to the adjacent ends. The first and second support assemblies are shown to be a mirror image of each other. In other embodiments, the first and second support assemblies are not symmetrical. The balls 30(1)-30(7) are still suspended in a horizontal line 60 even though the respective flexible lines or respective T-bars would not be symmetrical so as to maintain the horizontal line.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A ball collision demonstration device comprising:
    a base;
    first and second support assemblies carried by said base and spaced-apart and angled away from each other so that a separation distance at opposing ends of said first and second support assemblies is greater than a separation distance at medial portions of said first and second support assemblies;
    a plurality of balls;
    respective pairs of flexible lines coupled between said first and second support assemblies and each ball, with said plurality of balls being suspended in a horizontal line parallel to said base; and
    said respective pairs of flexible lines having, from the medial portions towards the opposing ends of said first and second support assemblies, increasing line lengths and increasing separation distances between each pair;
    whereby pulling back and releasing at least one ball at a first end of the horizontal line causes at least one ball at a second end of the horizontal line to rise to a height approximately equal to a height that the at least one ball at the first end was released.

2. The ball collision demonstration device according to claim 1 wherein each of said first and second support assemblies comprises a continuously extending rail supported by a plurality of legs.

3. The ball collision demonstration device according to claim 1 wherein each of said first and second support assemblies comprises a series of spaced apart vertically oriented posts.

4. The ball collision demonstration device according to claim 1 wherein said first and second support assemblies are coplanar.

5. The ball collision demonstration device according to claim 1 wherein said first and second support assemblies are non-planar so that a height of said first and second support assemblies from said base increases from the medial portions to the opposing ends.

6. The ball collision demonstration device according to claim 1 wherein each of said first and second support assemblies has a parabolic shape.

7. The ball collision demonstration device according to claim 1 wherein each of said first and second support assemblies has a V-shape.

8. The ball collision demonstration device according to claim 1 wherein each ball comprises steel.

9. The ball collision demonstration device according to claim 1 wherein said plurality of balls comprises a pair of outermost balls and a plurality of intermediate balls between said pair of outermost balls, with each intermediate ball comprising ferromagnetic material; and further comprising a plurality of ferromagnetic materials carried by said base, with each ferromagnetic material in said base being positioned directly under a respective intermediate ball, and with at least one of the ferromagnetic materials in said balls and said base being magnetized.

10. The ball collision demonstration device according to claim 9 wherein said base includes at least one channel therein for carrying said plurality of ferromagnetic materials.

11. A ball collision demonstration device comprising:
    a base;
    first and second support assemblies carried by said base and spaced-apart and angled from each other so that a separation distance at opposing ends of said first and second support assemblies is greater than a separation distance at medial portions of said first and second support assemblies, with said first and second support assemblies comprising a first and a second series of spaced apart vertically oriented posts, and with each post in said first series being paired with a corresponding post in the second series;
    a plurality of balls;
    respective T-bars comprising a horizontal segment and a vertical segment extending downwards from the horizontal segment, with each horizontal segment pivotally coupled to one of the paired posts in said first and second series and with each vertical segment coupled to one of the balls, with the plurality of balls being suspended in a horizontal line parallel to said base; and
    said respective T-bars having, from the medial portions towards the opposing ends of said first and second support assemblies, increasing lengths in the vertical segments and increasing lengths in the horizontal segments;
    whereby pulling back and releasing at least one ball at a first end of the horizontal line causes at least one ball at a second end of the horizontal line to rise to a height approximately equal to a height that the at least one ball at the first end was released.

12. The ball collision demonstration device according to claim 11 wherein a height of the first and second series of paired posts are equal so that said first and second support assemblies are coplanar.

13. The ball collision demonstration device according to claim 11 wherein a height of the first and second series of paired posts are not equal so that said first and second support assemblies are non-planar; and wherein a length of each vertical segment of a T-bar increases in length from middle pairs posts to the outermost paired posts as the paired posts increase in height.

14. The ball collision demonstration device according to claim 11 wherein each of said first and second support assemblies has a parabolic shape.

15. The ball collision demonstration device according to claim 11 wherein each of said first and second support assemblies has a V-shape.

16. The ball collision demonstration device according to claim 11 wherein each ball comprises steel.

17. The ball collision demonstration device according to claim 11 wherein said plurality of balls comprises a pair of outermost balls and a plurality of intermediate balls between said pair of outermost balls, with each intermediate ball comprising ferromagnetic material; and further comprising a plurality of ferromagnetic materials carried by said base, with each ferromagnetic material in said base being positioned directly under a respective intermediate ball, and with at least one of the ferromagnetic materials in said balls and said base being magnetized.

18. The ball collision demonstration device according to claim 17 wherein said base includes at least one channel therein for carrying said plurality of ferromagnetic materials.

* * * * *